(12) United States Patent
Martín García et al.

(10) Patent No.: US 10,427,098 B2
(45) Date of Patent: Oct. 1, 2019

(54) METHOD FOR THE REMOVAL OF NITROGEN OXIDES FROM EXHAUST GAS BY SELECTIVE CATALYTIC REDUCTION IN PRESENCE OF AN SCR CATALYST COMPRISING A FE-AEI ZEOLITHIC MATERIAL ESSENTIALLY FREE OF ALKALI METAL

(71) Applicant: Umicore AG & Co. KG, Hanau-Wolfgang (DE)

(72) Inventors: Nuria Martín García, Valencia (ES); Manuel Moliner Marín, Valencia (ES); Avelino Corma Canós, Valencia (ES); Joakim Reimer Thøgersen, Virum (DK); Peter Nicolai Ravnborg Vennestrøm, Copenhagen S (DK)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 15/779,458

(22) PCT Filed: Jan. 30, 2017

(86) PCT No.: PCT/EP2017/051911
§ 371 (c)(1),
(2) Date: May 25, 2018

(87) PCT Pub. No.: WO2017/134005
PCT Pub. Date: Aug. 10, 2017

(65) Prior Publication Data
US 2018/0250632 A1    Sep. 6, 2018

(30) Foreign Application Priority Data
Feb. 1, 2016  (DK) ................. 2016 70052

(51) Int. Cl.
*B01D 53/86*  (2006.01)
*B01D 53/94*  (2006.01)
(Continued)

(52) U.S. Cl.
CPC ..... *B01D 53/9418* (2013.01); *B01D 53/8628* (2013.01); *B01D 53/944* (2013.01);
(Continued)

(58) Field of Classification Search
CPC ...... B01D 53/9418; B01D 2255/20738; B01D 2255/50; B01D 2257/404;
(Continued)

(56) References Cited

U.S. PATENT DOCUMENTS 9,044,744 B2 * 6/2015 Casci ................. B01D 53/9418
2015/0141237 A1  5/2015 Andersen
(Continued)

FOREIGN PATENT DOCUMENTS

WO   2015084834 A1   6/2015

OTHER PUBLICATIONS

International Search Report received in PCT/EP2017/051911 dated Apr. 26, 2017.
(Continued)

*Primary Examiner* — Timothy C Vanoy
(74) *Attorney, Agent, or Firm* — Suzannah K. Sundby, Esq.; Canady + Lortz LLP

(57) ABSTRACT

A method for the removal of nitrogen oxides from exhaust, flue or off gas by selective catalytic reduction in presence of ammonia as a reductant, comprising the steps of contacting the exhaust gas together with the ammonia or a precursor thereof with an SCR catalyst comprising a Fe-AEI zeolite material essentially free of alkali metal ions (Alk), having the following molar compositions:

$SiO_2 : oAl_2O_3 : pFe : qAlk$ (Continued)

wherein o is in the range from 0.001 to 0.2;
wherein p is in the range from 0.001 to 0.2;
wherein Alk is one or more of alkali metal ions and wherein q is below 0.02.

20 Claims, 4 Drawing Sheets

(51) Int. Cl.
B01J 29/76 (2006.01)
B01J 35/00 (2006.01)
B01J 35/04 (2006.01)
F01N 3/20 (2006.01)
F01N 3/28 (2006.01)
B01J 29/14 (2006.01)

(52) U.S. Cl.
CPC ..... *B01D 53/9413* (2013.01); *B01D 53/9436* (2013.01); *B01D 53/9468* (2013.01); *B01D 53/9472* (2013.01); *B01J 29/14* (2013.01); *B01J 29/76* (2013.01); *B01J 35/002* (2013.01); *B01J 35/0006* (2013.01); *B01J 35/04* (2013.01); *F01N 3/2066* (2013.01); *F01N 3/2842* (2013.01); *B01D 2255/1021* (2013.01); *B01D 2255/1023* (2013.01); *B01D 2255/50* (2013.01); *B01D 2255/902* (2013.01); *B01D 2255/903* (2013.01); *Y02C 20/10* (2013.01)

(58) Field of Classification Search
CPC .............. B01D 2258/012; B01J 23/745; B01J 29/7207; F01N 3/2066; F01N 2370/04; F01N 2570/14
See application file for complete search history.

(56) References Cited

U.S. PATENT DOCUMENTS

2018/0093256 A1* 4/2018 Chen ..................... C01B 39/026
2018/0093257 A1* 4/2018 Chen ................... B01D 53/9418
2018/0345259 A1* 12/2018 Martin Garcia ......... B01J 37/06
2018/0346341 A1* 12/2018 Martin Garcia ..... B01J 37/0246

OTHER PUBLICATIONS

Moliner, et al., "Cu-SSZ-39, an active and hydrothermally stable catalyst for the selective catalytic reduction of NOx", Jun. 27, 2012, pp. 8264-8266, vol. 48, No. 66, Publisher: Chemical Communications.
Written Opinion received in PCT/EP2017/051911 dated Apr. 26, 2017.

* cited by examiner

METHOD FOR THE REMOVAL OF NITROGEN OXIDES FROM EXHAUST GAS BY SELECTIVE CATALYTIC REDUCTION IN PRESENCE OF AN SCR CATALYST COMPRISING A FE-AEI ZEOLITHIC MATERIAL ESSENTIALLY FREE OF ALKALI METAL

FIELD OF THE INVENTION

The present invention relates in general to the removal of harmful nitrogen oxides ($NO_x$=NO and $NO_2$) from exhaust, flue and off gasses.

In particular, the invention relates to selective catalytic reduction (SCR) of NOx by use of a hydrothermally stable iron-containing AEI zeolite in its silicoaluminate form essentially free of alkali.

BACKGROUND FOR THE INVENTION

Environmental and health risks request removing harmful nitrogen oxides ($NO_x$=NO and $NO_2$) from exhaust, flue and off gasses to avoid them being released into the environment. The primary source of $NO_x$ is thermal formation when nitrogen and oxygen reacts at higher temperatures. During combustion processes where oxygen from the air is used, $NO_x$ is an unavoidable by-product and present in the exhaust gas generated from internal combustion engines, power plants, gas turbines, gas engines and the like. The release of $NO_x$ is typically regulated by legislation that is becoming increasingly more stringent in most areas around the world. An efficient method to remove $NO_x$ from exhaust or flue gasses is by selective catalytic reduction where the $NO_x$ is selectively reduced using ammonia ($NH_3$-SCR), or a precursor thereof, as reducing agent (see Reaction 1-3). Selective catalytic reduction (SCR) of $NO_x$ by a reducing agent is an efficient way of reducing the amount of $NO_x$ in an exhaust, gas stream or flue gas. Typically, the reducing agent is a nitrogenous compound, such as ammonia or urea. For selective catalytic reduction using ammonia ($NH_3$-SCR) desirable reactions include:

$4NO+4NH_3+O_2 \rightarrow 4N_2+6H_2O$      (Reaction 1)

$2NO+2NO_2+4NH_3 \rightarrow 4N_2+6H_2O$      (Reaction 2)

$6NO_2+8NH_3 \rightarrow 7N_2+12H_2O$      (Reaction 3)

In addition to SCR reactions several unwanted side-reactions can occur. A known issue is the unselective oxidation of ammonia that can form additional $NO_x$ and also the formation of nitrous oxide is a known issue:

$4NH_3+5NO+3O_2 \rightarrow 4N_2O+6H_2O$      (Reaction 4)

$4NH_3+5O_2 \rightarrow 4NO+6H_2O$      (Reaction 5)

Besides nitrogenous containing compounds other compounds can also be used as reducing agents in the SCR reaction of NOx. Especially the use of hydrocarbons (HC) can also be used to selectively reduce nitrogen oxides (HC-SCR).

A general issue in the abatement of $NO_x$ from exhaust or flue gas systems from internal combustion engines, power plants, gas turbines, gas engines and the like is the penalty in pressure drop when a catalytic converter or any other article is introduced into the exhaust or flue gas system. The penalty arises because of the additional pressure required to push the exhaust or flue gas through the catalytic converter. Any decrease in the pressure drop over the catalytic converter will have a positive influence on efficiency and economy of the process. One method to decrease the pressure drop is by decreasing the size of the catalytic converter without compromising the $NO_x$ reduction efficiency, which requires the use of a more active catalyst composition. Therefore, any increase in catalyst activity is warranted.

Aluminosilicate zeolites and silicoaluminophosphate zeotypes are used as catalyst for SCR of $NO_x$. For $NH_3$-SCR the zeolite is typically promoted with transition metals. The most common used transition metals are iron and copper and the most commonly tested zeolite frameworks are *BEA, MFI and CHA (all given by the three-letter code devised by the International Zeolite Association).

Zeolite-based catalysts offer an alternative to vanadium-based SCR catalysts. Promoted with copper, zeolites typically exhibit a higher activity for $NH_3$-SCR than vanadium-based catalyst at low temperatures (e.g. <250° C.) and upon high-temperature excursions toxic volatile compounds are not released upon catalyst degradation, which can be the case for vanadium-based catalysts. One limitation of the use of Cu-zeolites is that they do not provide a high $NH_3$-SCR selectivity at high operational temperatures, approximately above 350° C. Iron-promoted zeolites on the other hand offer a high selectivity towards $NH_3$-SCR at temperatures above 350° C. at the expense of high activity at lower temperatures (e.g. around 150-200° C.).

Since all combustion processes lead to water being present in the exhaust or flue gas, there is a requirement for a high hydrothermal stability of the $NH_3$-SCR catalyst situated in a system wherefrom $NO_x$ should be removed. Especially the presence of water in the exhaust or flue gas is detrimental for zeolite-based catalysts since they are known to deactivate due to hydrolysis or degradation of the framework in presence of steam. Without being bound by any theory we believe this is related to dealumination of the aluminosilicate zeolite and thus will depend on the specific zeolite framework topology as well as the presence and identity of any extra-framework species hosted inside and onto the zeolite.

In general, there are several issues related to the use of metal promoted zeolites as SCR catalysts. First of all, the hydrothermal stability of the zeolite is not always sufficient. Since there will typically be some amount of water present, this, will in combination with high-temperature excursions, lead to dealumination and collapse of the crystalline microporous structure of the zeolite, that will ultimately lead to deactivation of the catalytically active material. Secondly, any hydrocarbons present will adsorb and deactivate the zeolite catalyst. Additionally, the presence of sulfur containing species (e.g. $SO_2$ and $SO_3$ etc.) in the system will lead to deactivation of the zeolite catalyst. In addition, formation of unwanted $N_2O$ also occurs. Furthermore, unwanted oxidation of ammonia at higher temperatures also occurs.

In terms of the transition metal introduced into the zeolite it is generally accepted that Cu-promotion leads to a higher $NH_3$-SCR activity (see Reaction 1-3) at low temperatures (<300° C.) compared to Fe. However, Cu-promoted materials also produce more $N_2O$ (Reaction 4) and are less selective for the $NH_3$-SCR reaction at higher temperatures (>300° C.) due to unselective ammonia oxidation (Reaction 5). When it comes to the influence of the transition metal the hydrothermal stability seems to be more dependent on the specific type of zeolite and zeotype framework. For example, Fe-*BEA materials are typically more hydrothermally stable than Cu-*BEA materials, whereas Cu-CHA materials are more hydrothermally stable than Fe-CHA materials [F. Gao, Y. Wang, M. Kollár, N. M. Washton, J.

Szanyi, C. H. F. Peden, *Catal. Today* 2015, 1-12]. It is also generally accepted that Fe-promoted materials produce less $N_2O$ than their Fe-based equivalents [S. Brandenberger, O. Kröcher, A. Tissler, R. Althoff, *Catal. Rev.* 2008, 50, 492-531].

In the last years, it has been described that copper-containing small-pore aluminosilicate and silicoaluminophosphate Cu-CHA materials, Cu-SSZ-13 and Cu-SAPO-34 respectively, show high catalytic activity and hydrothermal stability for use as $NH_3$-SCR catalyst [U.S. Pat. No. 7,601, 662 B2; European Patent 2150328 B1, U.S. Pat. No. 7,883, 678 B2].

[F. Gao, Y. Wang, N. M. Washton, M. Kollar, J. Szanyi, C. H. F. Peden, ACS Catal. 2015, DOI 10.1021/acscatal.5b01621] investigate the effect of alkaline and alkaline co-cations in Cu-CHA aluminosilicate SSZ-13. They find that certain co-cations in combination with the promotor metal-ion can enhance the activity as well as the hydrothermal stability of the Cu-CHA-based material. The study is however, limited to aluminosilicate zeolite SSZ-13 (CHA-zeolite) and any conclusions based on this material cannot be transferred to other aluminosilicate zeolite materials, frameworks or other promotor metal based zeolite systems.

Another zeolite topology related to that of CHA is the AEI topology. This structure also exhibits small pores (defined by eight oxygen atoms in micropore windows of the structure), similar to the CHA structure. Thus, without being bound by any theory, some of the benefits from using a CHA zeolite or zeotypes should also be present in the use of AEI based zeolite and zeotype. A method of synthesis of aluminosilicate AEI zeolite SSZ-39 was first disclosed in U.S. Pat. No. 5,958,370 using a variety of cyclic and polycyclic quaternary ammonium cation templating agents. U.S. Pat. No. 5,958,370 also claims a process for the process for the reduction of oxides of nitrogen contained in a gas stream in the presence of oxygen wherein said zeolite contains metal or metal ions capable of catalyzing the reduction of the oxides of nitrogen.

U.S. Pat. No. 9,044,744 B2 discloses an AEI catalyst promoted with about one to five weight percent of a promoter metal present. U.S. Pat. No. 9,044,744 B2 is ambiguous about the content of alkali and alkaline earth metals in the zeolite. In the description of U.S. Pat. No. 9,044,744 B2 a certain embodiment is mentioned where the catalyst composition comprises at least one promoter metal and at least one alkali or alkaline earth metal. In another embodiment the catalyst is essentially free of any alkali or alkaline earth metals except potassium and or calcium. However, there is no discussion or mention of the benefits of alkali or alkaline earth metals being present in the catalyst.

U.S. Patent 20150118134 A1 and [M. Moliner, C. Franch, E. Palomares, M. Grill, A. Corma, *Chem. Commun.* 2012, 48, 8264-6] teaches us that the AEI zeolite framework promoted with copper ions is a stable zeolite $NH_3$-SCR catalyst system for treating the exhaust gas from an internal combustion engine. The Cu-AEI zeolite and zeotype catalytic system is stable during regeneration of an up-stream particulate filter up to 850° C. and water vapour content up to 100%. However, the effect of alkali is not discussed. Furthermore, the patent applications is solely concerned about the use of copper as a promoter metal ion, and the effect can therefore not be transferred to catalytic systems with other promoter metal ions.

WO 2015/084834 patent application claims a composition comprising a synthetic zeolite having the AEI structure and an in situ transition metal dispersed within the cavities and channels of the zeolite. In situ transition metal refers to a non-framework transition metal incorporated into the zeolite during its synthesis and is described as a transition metal-amine complex.

The use of Cu-amine complexes has been extensively described in the last years for the direct synthesis of Cu-containing zeolites, especially Cu-CHA materials [L. Ren, L. Zhu, C. Yang, Y. Chen, Q. Sun, H. Zhang, C. Li, F. Nawaz, X. Meng, F.-S. Xiao, *Chem. Commun.* 2011, 47, 9789; R. Martinez-Franco, M. Moliner, J. R. Thogersen, A. Corma, *ChemCatChem* 2013, 5, 3316-3323.; R. Martinez-Franco, M. Moliner, C. Franch, A. Kustov, A. Corma, *Appl. Catal. B Environ.* 2012, 127, 273-280; R. Martinez-Franco, M. Moliner, P. Concepcion, J. R. Thogersen, A. Corma, *J. Catal.* 2014, 314, 73-82] and lately also for Cu-AEI materials [R. Martinez-Franco, M. Moliner, A. Corma, J. Catal. 2014, 319, 36-43]. In all cases, the transition metal is stabilized by complexing with a polyamine. However, no report exists on the direct synthesis of Fe-AEI zeolites wherein the promotor metal is iron and where the iron does not require a complexing agent such as polyamine.

In many applications it is beneficial to have a high catalytic activity at temperatures >300° C. and at the same time have a high selectivity towards the $NH_3$-SCR reaction (Reaction 1-3) without forming nitrous oxide or unselective ammonia oxidation (Reaction 4-5). In such applications iron-promoted zeolites are preferred.

Another benefit of zeolite catalysts is that in some cases they may be able to decompose nitrous oxide at higher temperatures [Y. Li, J. N. Armor, *Appl. Catal. B Environ.* 1992, 1, L21-L29]. Fe-*BEA zeolites are in general highly active in this reaction [B. Chen, N. Liu, X. Liu, R. Zhang, Y. Li, Y. Li, X. Sun, *Catal. Today* 2011, 175, 245-255] and should be considered state-of-the-art.

In applications where the catalyst is exposed to high temperatures it is also necessary to maintain the catalytic activity without severe deactivation. Typically, the gas stream wherein the catalyst will be situated contains some amount of water. For this reason, the hydrothermal stability of the catalyst should be high. This is especially detrimental for zeolite-based catalyst as they are known to deactivate due to hydrolysis or degradation of the framework in the presence of steam.

Some Cu-promoted zeolites exhibit a high hydrothermal stability and can typically tolerate temperature excursion up to about 850° C. However, this is not the case for Fe-promoted zeolites and the hydrothermal stability of Fe-promoted zeolites is in general lower than Cu-zeolites. The fact that Fe- and Cu-zeolites deactivate in a different manner is further corroborated in a study by Vennestrom et al. [P. N. R. Vennestrom, T. V. W. Janssens, A. Kustov, M. Grill, A. Puig-Molina, L. F. Lundegaard, R. R. Tiruvalam, P. Concepcion, A. Corma, *J. Catal.* 2014, 309, 477-490].

We have found that when decreasing the alkali metal content in iron promoted AEI zeolites, the hydrothermal stability is increased. By decreasing the alkali content, which is naturally present after synthesis of AEI zeolites, the stability of iron-promoted AEI zeolite becomes higher than other zeolite systems with similar iron contents. The zeolite catalyst of the present invention provides improved hydrothermal stability, high selectivity towards selective catalytic reduction at temperatures above 300° C. and low selectivity towards unselective ammonia oxidation and formation of nitrous oxide.

SUMMARY OF THE INVENTION

Pursuant to the above findings, this invention provides a method for the removal of nitrogen oxides from exhaust gas by selective catalytic reduction in presence of ammonia reductant, comprising the steps of contacting the exhaust gas together with the ammonia or a precursor thereof with an SCR catalyst comprising a Fe-AEI zeolithic material essentially free of alkali metal (Alk), having the following molar compositions:

$$SiO_2:oAl_2O_3:pFe:qAlk$$

wherein o is in the range from 0.001 to 0.2;
wherein p is in the range from 0.001 to 0.2;
wherein Alk is one or more of alkali ions and wherein q is below 0.02.

Specific features of the invention are alone or in combination thereof that o is in the range from 0.005 to 0.1, p is in the range from 0.005 to 0.1 and q is below 0.005;

o is in the range from 0.02 to 0.07, p is in the range from 0.01 to 0.07 and q is below 0.001;

Alk is sodium and wherein the sodium is essentially absent in the catalyst;

the exhaust gas contains more than about 1% steam;

the exhaust gas is at a temperature of above 200° C. for most of the operational time;

the SCR catalyst is coated in or on a porous substrate;

the substrate is a metallic substrate or an extruded ceramic substrate or a corrugated ceramic substrate;

the substrate is in form of a flow-through monolith, a flow-through honeycomb or a wall-flow filter;

the SCR catalyst is coated in an amount of between 10 and 600 g/L calculated on the weight of catalyst material per volume of the total substrate plus the catalyst material;

the amount of the SCR catalyst coated on the substrate is between 100 and 300 g/L;

the SCR catalyst is coated in or on the porous substrate in form of a wash coat comprising the SCR catalyst and a binder comprising $TiO_2$, $SiO_2$, $Al_2O_3$, $ZrO_2$, $CeO_2$ and combinations thereof;

the SCR catalyst is coated as a layer on the substrate and wherein the substrate comprises one or more other layers comprising a catalyst with a different catalytic activity or on other zeolite catalysts;

the SCR catalyst is zone coated on the substrate;

the substrate comprises a further zone with an oxidation catalyst;

the substrate comprises a zone with an ammonia slip catalyst;

the exhaust gas is a gas turbine exhaust gas;

hydrocarbons and carbon monoxide further contained in the turbine exhaust gas are oxidized to water and carbon dioxide by contact with an oxidation catalyst;

the oxidation catalyst is arranged up-stream or down-stream of the SCR catalyst;

the exhaust gas is a gas engine exhaust gas.

DETAILED DESCRIPTION OF THE INVENTION

Figure 1:
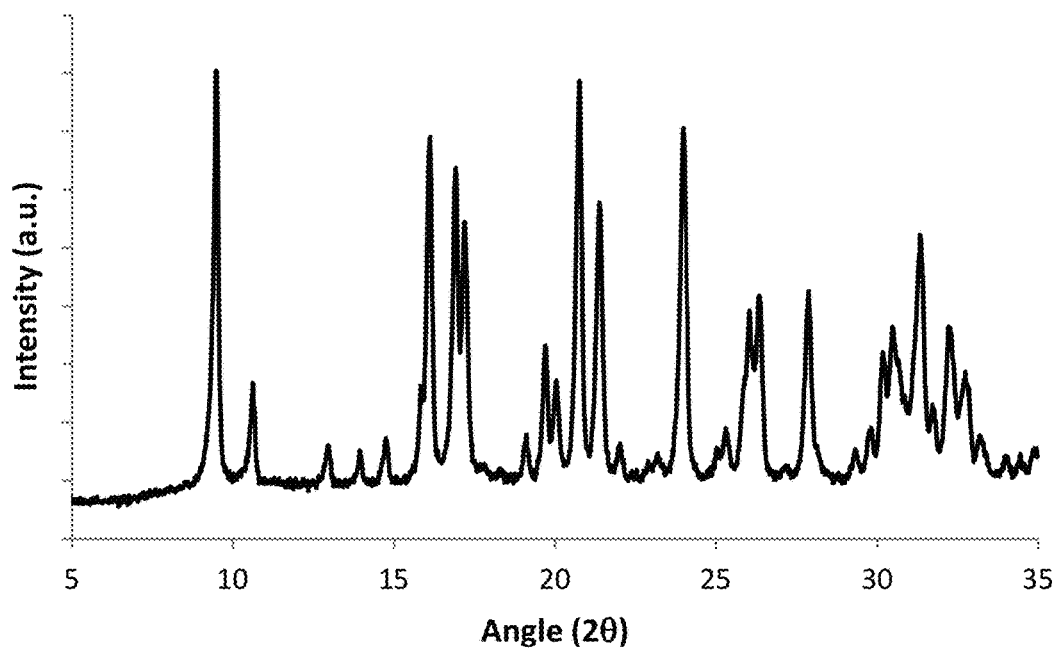
FIG. 1 is a Powder X-ray diffraction pattern of as-prepared silicoaluminate AEI zeolite synthesized according to Example 1.

The catalyst according to the invention can preferably prepared by a method, comprising the following steps:

(i) preparation of a mixture containing water, a high-silica zeolite as main source of silica and alumina, an alkyl-substituted cyclic ammonium cation as organic structure directing agent (OSDA), a source of iron, and a source of an alkali metal cation [Alk], to obtain a final synthesis mixture having the following molar composition:

$$SiO_2:a\ Al_2O_3:b\ Fe:c\ OSDA:d\ Alk:e\ H_2O$$

wherein a is in the range from 0.001 to 0.2, more preferably in the range from 0.005 to 0.1, and most preferably in the range from 0.02 to 0.07;

wherein b is in the range from 0.001 to 0.2; more preferably in the range from 0.005 to 0.1, and most preferably in the range from 0.01 to 0.07;

wherein c is in the range from 0.01 to 2; more preferably in the range from 0.1 to 1, and most preferably in the range from 0.1 to 0.6;

wherein d is in the range from 0.001 to 2; more preferably in the range from 0.05 to 1, and most preferably in the range from 0.1 to 0.8 and wherein e is in the range from 1 to 200; more preferably in the range from 1 to 50, and most preferably in the range from 2 to 20;

(ii) crystallization of the mixture achieved in (i) in a reactor;

(iii) recovery of the crystalline material achieved in (ii);

(iv) removal of the OSDA occluded in the zeolite structure by calcination of the crystalline material from step (iii);

(v) ion exchange of the alkali metal cation present in the crystalline material from step (iv), with ammonium or proton cations to obtain a final crystalline zeolite catalyst material with a low alkali content.

Preferably, the high-silica zeolite structure used as a main source of silica and alumina has a Si/Al ratio above 5. Even more preferable the high silica zeolite has the FAU structure, e.g. Zeolite-Y.

The iron source can be selected from iron oxides or iron salts, such as chlorides and other halides, acetates, nitrates or sulfates, among others, and combinations of them. The iron source can be introduced directly in the mixture of (i), or previously combined with the crystalline source of Si and Al.

Any alkyl-substituted cyclic ammonium cation can be used as OSDA. Preferred are N,N-dimethyl-3,5-dimethylpiperidinium (DMDMP), N,N-diethyl-2,6-dimethylpiperidinium, N,N-dimethyl-2,6-dimethylpiperidinium, N-ethyl-N-methyl-2,6-dimethylpiperidinium, and combinations of them.

In step (i) any alkali cation can be used, such as sodium, potassium, lithium, and cesium and combinations of them.

In the crystallization step (ii), hydrothermal treatment is performed in an autoclave, under static or dynamic conditions. The preferred temperature is in the range of between 100 and 200° C., more preferably in the range of 130 to 175° C.

The preferred crystallization time is ranged from 6 hours to 50 days, more preferably in the range of 1 to 20 days, and more preferably in the range of 1 to 7 days. It should be taken into consideration that the components of the synthesis mixture may come from different sources, and depending on them, times and crystallization conditions may vary.

In order to facilitate the synthesis, crystals of AEI can be added as seeds, in quantities up to 25% by weight respect to the total of oxides, to the synthesis mixture. These can be added before or during the crystallization process.

After the crystallization stage described in (ii), the resultant solids are separated from the mother liquor. The solids can be washed and separated from the mother liquor in (iii) by decantation, filtration, ultrafiltration, centrifugation, or any other solid-liquid separation technique.

Organic material occluded inside the material can be removed by extraction and/or thermal treatment at temperatures over 25° C., preferentially between 400 and 750° C., during a period of time between 2 minutes and 25 hours.

The material essentially free of occluded organic molecules is ion exchanged with ammonium or hydrogen to selectively remove the alkali metal cations by cation exchange procedures. The resulting exchanged AEI material can be calcined with air and/or nitrogen at temperatures between 200 and 700° C.

The catalyst according to the invention can also be prepared by first synthesizing an AEI zeolite SSZ-39 according to known methods as described in U.S. Pat. No. 5,958,370. After synthesis the occluded organic material must be removed as described above. Afterwards the material essentially free of occluded organic molecules is ion exchanged with ammonium or hydrogen ions to selectively remove the alkali metal cations by cation exchange procedures. Instead of including iron compounds in the synthesis mixture, iron can be introduced into the cation exchanged material after step (v) by exchange, impregnation or solid-state procedures to yield a zeolite with the AEI framework containing iron species and essentially free of alkali metals.

The Fe-AEI zeolite catalyst according to the invention is in particular useful in heterogeneous catalytic converter systems, such as when the solid catalyst catalyzes the reaction of molecules in the gas phase. To improve the applicability of the catalyst it can be applied into or onto a substrate that improves contact area, diffusion, fluid and flow characteristics of the gas stream wherein the present invention is applied.

The substrate can be a metal substrate, an extruded substrate or a corrugated substrate made of ceramic paper. The substrate can be designed for the gas as a flow-through design or a wall-flow design. In the latter case the gas should flow through the walls of the substrate and in this way contribute with an additional filtering effect.

The Fe-AEI zeolite catalyst is preferably present on or in the substrate in amounts between 10 and 600 g/L, preferably 100 and 300 g/L, as measured by the weight of the zeolite material per volume of the total catalyst article.

The Fe-AEI zeolite catalyst is coated on or in the substrate using known wash-coating techniques. In this approach the zeolite powder is suspended in a liquid media together with binder(s) and stabilizer(s) where-after the washcoat can be applied onto the surfaces and walls of the substrate.

The washcoat containing the Fe-AEI zeolite catalyst contains optionally binders based on $TiO_2$, $SiO_2$, $Al_2O_3$, $ZrO_2$, $CeO_2$ and combinations thereof.

The Fe-AEI zeolite catalyst can also be applied as one or more layers on the substrate in combination with other catalytic functionalities or other zeolite catalysts. One specific combination is a layer with an oxidation catalyst containing for example platinum or palladium or combinations thereof.

The Fe-AEI zeolite catalyst can be additionally applied in limited zones along the gas-flow-direction of the substrate.

One important feature of the method according to the invent is the application of the Fe-AEI zeolite catalyst essentially free of alkali metals in the reduction of nitrogen oxides in the exhaust gas coming from a gas turbine using ammonia as a reductant.

In this application, the catalyst may be placed directly downstream from the gas turbine and thus exposed to an exhaust gas containing water. It may also be exposed to large temperature fluctuations during gas turbine start-up and shut-down procedures.

In certain applications, the Fe-AEI zeolite catalyst is used in a gas turbine system with a single cycle operational mode without any heat recovery system down-stream of the turbine. When placed directly after the gas turbine the catalyst is able to withstand exhaust gas temperatures up to 650° C. with a gas composition containing water.

Further applications are in a gas turbine exhaust treatment system in combination with a heat recovery system such as a Heat Recovery System Generator (HRSG). In such a process design, the Fe-AEI catalyst is arranged in between the gas turbine and the HRSG. The catalyst can be also arranged in several locations inside the HRSG.

Still an application of the Fe-AEI catalyst is the employment in combination with an oxidation catalyst for the abatement of hydrocarbons and carbon monoxide in the exhaust gas from the gas turbine.

The oxidation catalyst, typically composed of precious metals, such as Pt and Pd, can be placed either up-stream or down-stream of the Fe-AEI catalyst and both inside and outside of the HRSG. The oxidation functionality can also be combined with the Fe-AEI catalyst into a single catalytic unit.

The oxidation functionality may be combined directly with the Fe-AEI zeolite by using the zeolite as support for the precious metals. The precious metals can also be supported onto another support material and physically mixed with the Fe-AEI zeolite. The Fe-AEI catalyst and oxidation catalyst may be applied in layers onto a substrate such as a monolithic structure. For example, the zeolite SCR catalyst may be placed in a layer on top of a layer of the oxidation catalyst onto a substrate. The zeolite may also be placed in a downstream layer below an oxidation layer on the substrate.

The Fe-AEI catalyst and oxidation catalyst can furthermore be applied in different zones onto the monolith or down-stream of each other.

The Fe-AEI catalyst can also be combined in zones or layers with other catalytic materials. For example, the catalyst can be combined with an oxidation catalyst or another SCR catalyst.

In all application of the method according to the invention mentioned and described above, the Fe-AEI zeolite catalyst can be applied in or on a substrate such as a monolithic structure or it can be shaped into pellets depending on the requirements of the application.

EXAMPLES

Example 1: Synthesis of AEI Zeolite (Na-containing Material)

4.48 g of a 7.4% wt aqueous solution of N,N-dimethyl-3,5-dimethylpiperidinium hydroxide was mixed with 0.34 g of a 20% wt aqueous solution of sodium hydroxide (NaOH granulated, Scharlab). The mixture was maintained under stirring 10 minutes for homogenization. Afterwards, 0.386 g of FAU zeolite (FAU, Zeolyst CBV-720 with $SiO_2/Al_2O_3=21$) was added in the synthesis mixture, and maintained under stirring the required time to evaporate the excess of water until achieving the desired gel concentration. The final gel composition was $SiO_2$: 0.047 $Al_2O_3$: 0.4 DMDMP: 0.2 NaOH: $15H_2O$. The resultant gel was charged into a stainless steel autoclave with a Teflon liner. The crystallization was then conducted at 135° C. for 7 days under static conditions. The solid product was filtered, washed with abundant amounts of water, dried at 100° C. and, finally, calcined in air at 550° C. for 4 h.

The solid was characterized by Powder X-ray Diffraction, obtaining the characteristic peaks of the AEI structure (see FIG. 1). The chemical analysis of the sample indicates a Si/Al ratio of 9.0.

Example 2: Direct Synthesis of the Fe-containing AEI Structure (Na-containing Material)

Figure 2:
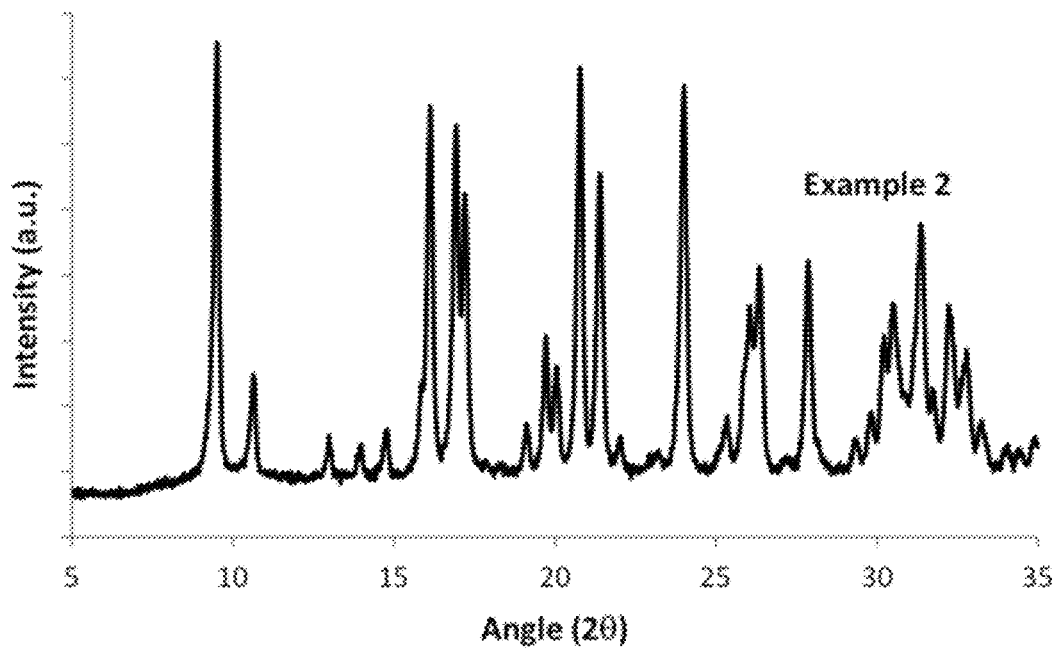
FIG. 2 is a Powder X-ray diffraction pattern of as-prepared direct synthesis of Fe- and Na-containing silicoaluminate AEI zeolite synthesized according to the Example 2.

1.98 g of a 7.0% wt aqueous solution of N,N-dimethyl-3,5-dimethylpiperidinium hydroxide was mixed with 0.24 g of a 20% wt aqueous solution of sodium hydroxide (NaOH granulated, Scharlab). The mixture was maintained under stirring 10 minutes for homogenization. Afterwards, 0.303 g of FAU zeolite (FAU, Zeolyst CBV-720 with $SiO_2/Al_2O_3=21$) was added in the synthesis mixture. Finally, 0.11 g of a 20% wt aqueous solution of iron (III) nitrate [Fe$(NO_3)_3$, Sigma Aldrich, 98%] was added, and the synthesis mixture was maintained under stirring the required time to evaporate the excess of water until achieving the desired gel concentration. The final gel composition was $SiO_2$: 0.047 $Al_2O_3$: 0.01 Fe: 0.2 DMDMP: 0.2 NaOH: $15H_2O$. The resultant gel was charged into a stainless steel autoclave with a Teflon liner. The crystallization was then conducted at 140° C. for 7 days under static conditions. The solid product was filtered, washed with abundant water, and dried at 100° C. The solid was characterized by Powder X-ray Diffraction, obtaining the characteristic peaks of the AEI structure (see FIG. 2). Finally, the as-prepared solid was calcined in air at 550° C. for 4 h. The solid yield achieved was above 85% (without taking into account the organic moieties). The chemical analysis of the sample indicates a Si/Al ratio of 8.0, an iron content of 1.1% wt and a sodium content of 3.3% wt.

Example 3: Synthesis of Fe-containing Na-free AEI Zeolite by Post-synthetic Ion Exchange The Na-containing AEI material from Example 1 was first exchanged with a 0.1 M solution of ammonium nitrate ($NH_4NO_3$, Fluka, 99 wt %) at 80° C. Then, 0.1 g of ammonium-exchanged AEI zeolite was dispersed in 10 ml of deionized water with pH adjusted to 3 using 0.1 M $HNO_3$. The suspension was heated to 80° C. under nitrogen atmosphere, 0.0002 moles of $FeSO_4.7H_2O$ was then added, and the resultant suspension maintained under stirring at 80° C. for 1 h. Finally, the sample was filtered, washed and calcined at 550° C. for 4 h. The final iron content in the sample was 0.9 wt % and the Na content was below 0.0% wt.

Example 4: Removal of Na from the Direct Synthesis of the Fe-containing AEI Material from Example 2

200 mg of the calcined Fe-containing AEI material synthesized according to the Example 2, was mixed with 2 ml of a 1 M aqueous solution of ammonium chloride (Sigma-Aldrich, 98% wt), and the mixture was maintained under stirring at 80° C. for 2 h. The solid product was filtered, washed with abundant water, and dried at 100° C. Finally, the solid was calcined in air at 500° C. for 4 h. The chemical analysis of the sample indicates a Si/Al ratio of 8.0, an iron content of 1.1% wt and sodium content below 0.0% wt.

Example 5: Direct Synthesis of the Fe-containing CHA Structure (Na-containing Material)

0.747 g of a 17.2% wt aqueous solution of trimethyl-1-adamantammonium hydroxide (TMAdaOH, Sigma-Aldrich) was mixed with 0.13 g of a 20% wt aqueous solution of sodium hydroxide (NaOH, Sigma-Aldrich). Then, 0.45 g of a colloidal suspension of silica in water (40% wt, LUDOX-AS, Sigma-Aldrich) and 23 mg of alumina (75% wt, Condea) were added, and the resultant mixture maintained under stirring for 15 minutes. Finally, 0.458 g of a 2.5% wt aqueous solution of iron (III) nitrate [Fe$(NO_3)_3$, Sigma Aldrich, 98%] was added, and the synthesis mixture was maintained under stirring the required time to evaporate the excess of water until achieving the desired gel concentration. The final gel composition was $SiO_2$: 0.05 $Al_2O_3$: 0.01 Fe: 0.2 TMAdaOH: 0.2 NaOH: $20H_2O$. The resultant gel was charged into a stainless steel autoclave with a Teflon liner. The crystallization was then conducted at 160° C. for 10 days under static conditions. The solid product was filtered, washed with abundant water, and dried at 100° C. The solid was characterized by Powder X-ray Diffraction, obtaining the characteristic peaks of the CHA zeolite. Finally, the as-prepared solid was calcined in air at 550° C. for 4 h. The chemical analysis of the sample indicates a Si/Al ratio of 12.6, an iron content of 1.0% wt and a sodium content of 1.5% wt.

Example 6: Removal of Na from the Direct Synthesis of the Fe-containing CHA Structure from Example 5

100 mg of the calcined Fe-containing CHA material was mixed with 1 ml of a 1 M aqueous solution of ammonium chloride (Sigma-Aldrich, 98% wt), and the mixture maintained under stirring at 80° C. for 2 h. The solid product was filtered, washed with abundant water, and dried at 100° C. Finally, the solid was calcined in air at 500° C. for 4 h. The chemical analysis of the sample indicates a Si/Al ratio of 12.6, an iron content of 1.10% wt and a sodium content of 0.0% wt.

Example 7: Direct Synthesis of the Fe-containing Beta Structure (Na-free Material)

0.40 g of a 35% wt aqueous solution of tetraethylammonium hydroxide (TEAOH, Sigma-Aldrich) was mixed with 0.34 g of a 50% wt aqueous solution of tetraethylammonium bromide (TEABr, Sigma-Aldrich). Then, 0.60 g of a colloidal suspension of silica in water (40% wt, LUDOX-AS, Sigma-Aldrich) and 18 mg of alumina (75% wt, Condea) were added, and the resultant mixture maintained under stirring for 15 minutes. Finally, 0.33 g of a 5% wt aqueous solution of iron (III) nitrate [$Fe(NO_3)_3$, Sigma Aldrich, 98%] was added, and the synthesis mixture was maintained under stirring the required time to evaporate the excess of water until achieving the desired gel concentration. The final gel composition was $SiO_2$: 0.032 $Al_2O_3$: 0.01 Fe: 0.23 TEAOH: 0.2 TEABr: $20H_2O$. The resultant gel was charged into a stainless steel autoclave with a Teflon liner. The crystallization was then conducted at 140° C. for 7 days under static conditions. The solid product was filtered, washed with abundant water, and dried at 100° C. The solid was characterized by Powder X-ray Diffraction, obtaining the characteristic peaks of the Beta zeolite. Finally, the as-prepared solid was calcined in air at 550° C. for 4 h. The chemical analysis of the sample indicates a Si/Al ratio of 13.1, an iron content of 0.9% wt and a sodium content of 0.0% wt.

Example 8: Catalytic Test of Materials in the Selective Catalytic Reduction of Nitrogen Oxides Using Ammonia The activity of selected samples was evaluated in the catalytic reduction of $NO_x$ using $NH_3$ in a fixed bed, quartz tubular reactor of 1.2 cm of diameter and 20 cm of length. The catalyst was tested using 40 mg with a sieve fraction of 0.25-0.42 mm. The catalyst was introduced in the reactor, heated up to 550° C. in a 300 NmL/min flow of nitrogen and maintained at this temperature for one hour. Afterwards 50 ppm NO, 60 ppm $NH_3$, 10% O2 and 10% $H_2O$ was admitted over the catalyst while maintaining a flow of 300 mL/min. The temperature was then decreased stepwise between 550 and 250° C. The conversion of NO was measured under steady state conversion at each temperature using a chemi-luminiscence detector (Thermo 62C).

Example 9: Accelerated Hydrothermal Ageing Treatment of Samples

Selected samples were treated in a gas mixture containing 10% $H_2O$, 10% $O_2$ and $N_2$ for 13 hours at 600° C. and afterwards their catalytic performance was evaluated according to Example 8.

Figure 3:
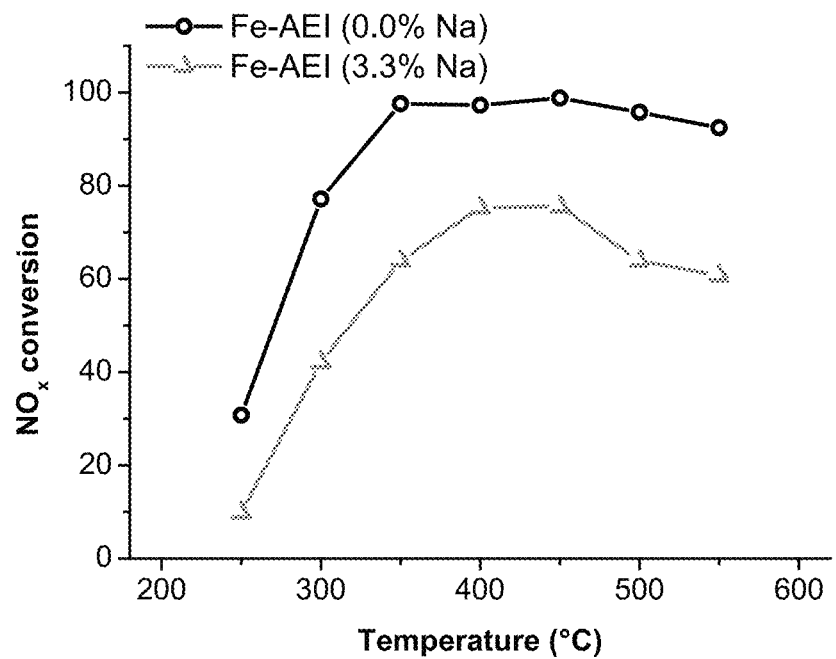
FIG. 3 is a $NO_x$ conversion over Fe-AEI zeolite catalyst with and without Na present.

Example 10: Influence of Na on Catalytic Performance of Fe-AEI Before Accelerated Aging The Fe-AEI zeolite containing Na as synthesized in Example 2 was tested according to Example 8. For comparison the Fe-AEI zeolite that was essentially free of Na, prepared according to Example 4, was also evaluated in the $NH_3$-SCR reaction according to Example 8. The steady state-conversion of NO is shown as a function of temperature for the two catalysts in FIG. 3. The results clearly show the beneficial influence of removing the Na from the Fe-AEI zeolite as the $NO_x$ conversion increases at all temperatures.

Figure 4:
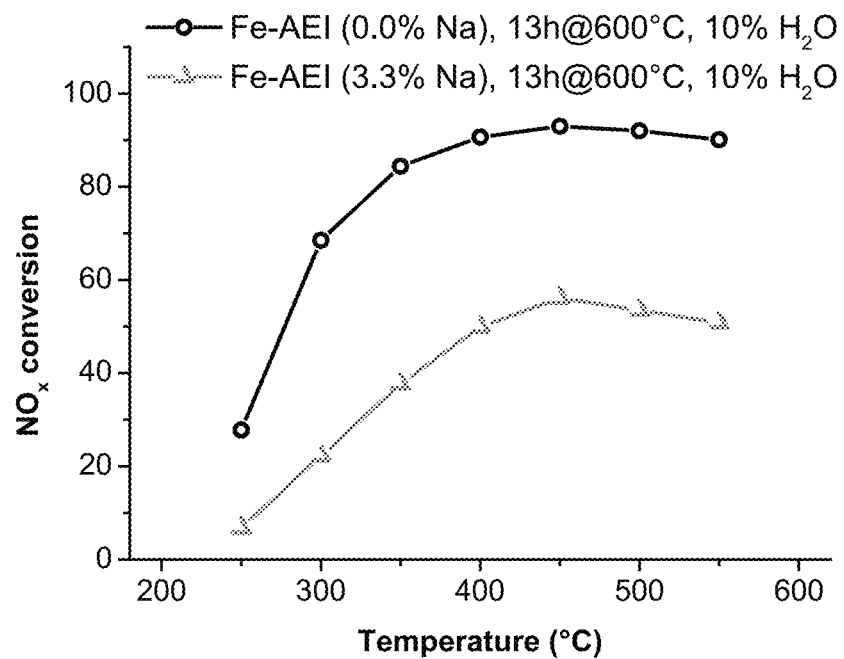
FIG. 4 is a $NO_x$ conversion over Fe-AEI zeolite catalyst with and without Na present after accelerated hydrothermal aging (conditions given in Example 9)

Example 11: Influence of Na on Catalytic Performance of Fe-AEI after Accelerated Hydrothermal Aging The two zeolites that were tested in Example 10 (and prepared in Example 2 and Example 4) were aged under the accelerated aging conditions given in Example 9. The $NO_x$ conversion after aging is shown in FIG. 4.

Figure 5:
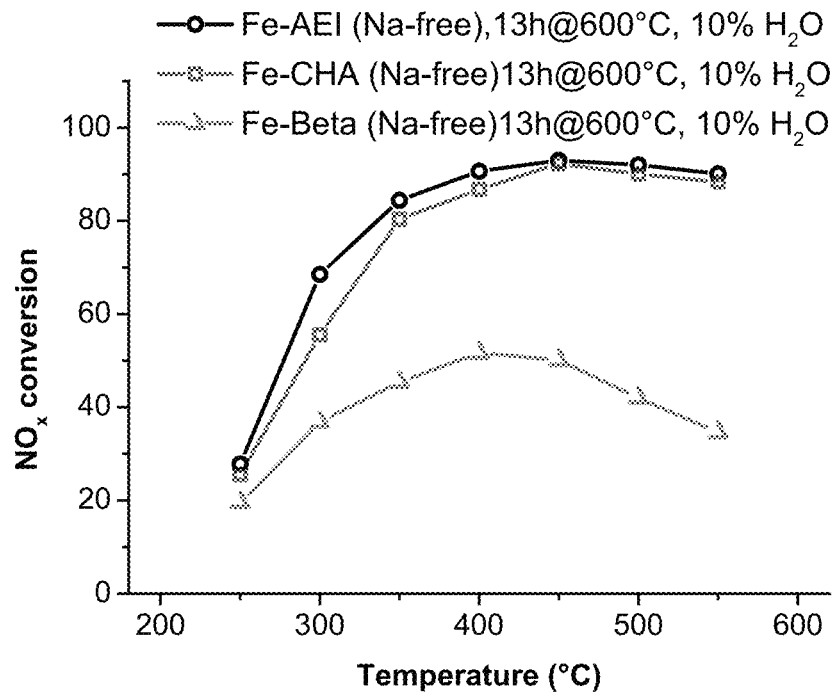
FIG. 5 is a $NO_x$ conversion over Na-free Fe-AEI compared to state-of-the-art Fe-CHA and Fe-Beta zeolites (also Na-free) after accelerated hydrothermal aging (conditions given in Example 9)

Example 12: Catalytic Performance of Na-free Fe-AEI Compared to State-of the Art Fe-Beta and Fe-CHA Zeolites after Accelerated Hydrothermal Aging The $NO_x$ conversion over Na-free Fe-AEI, prepared according to Example 4, was evaluated in the $NH_3$-SCR reaction after accelerated hydrothermal aging. For comparison Na-free Fe-CHA and Na-free Fe-Beta catalysts (prepared in Example 6 and Example 7, respectively), which represents state-of-the-art iron promoted zeolite catalysts, were also tested after accelerated hydrothermal aging. The measured $NO_x$ conversion is shown in FIG. 5. As can be seen the $NO_X$ conversion is higher over Na-free Fe-AEI compared to the other zeolites.

Figure 6:
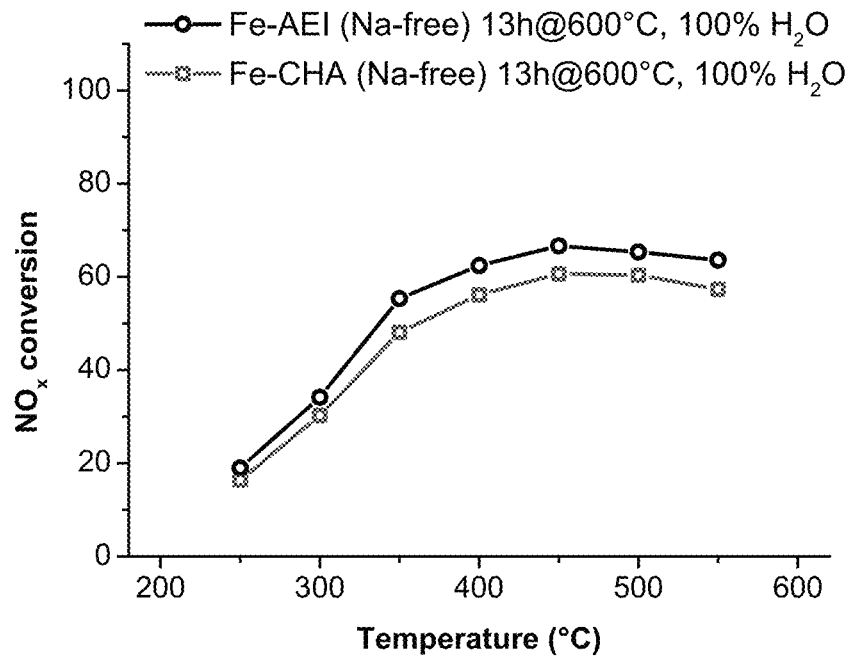
FIG. 6 is a $NO_x$ conversion over Na-free Fe-AEI compared to state-of-the-art Na-free Fe-CHA after severe accelerated hydrothermal aging at 600° C. with 100% $H_2O$ aging.

Example 13: Catalytic Performance of Na-free Fe-AEI Compared to State-of the Art Fe-CHA Zeolites after Severe Accelerated Hydrothermal Aging A severe accelerated aging of Na-free Fe-AEI and Na-free Fe-CHA prepared in Example 4 and Example 6, respectively, was performed by steaming the catalyst in a muffle furnace with 100% $H_2O$ for 13 h at 600° C. Afterwards the samples were evaluated according to Example 8. The $NO_x$ conversion in the $NH_3$-SCR reaction over the two Fe-zeolites is shown in FIG. 6. As seen from FIG. 6 the improved stability of Fe-AEI is evident from the higher $NO_x$ seen at all temperatures.

Example 14: Determination of Crystal Size

Figure 7:
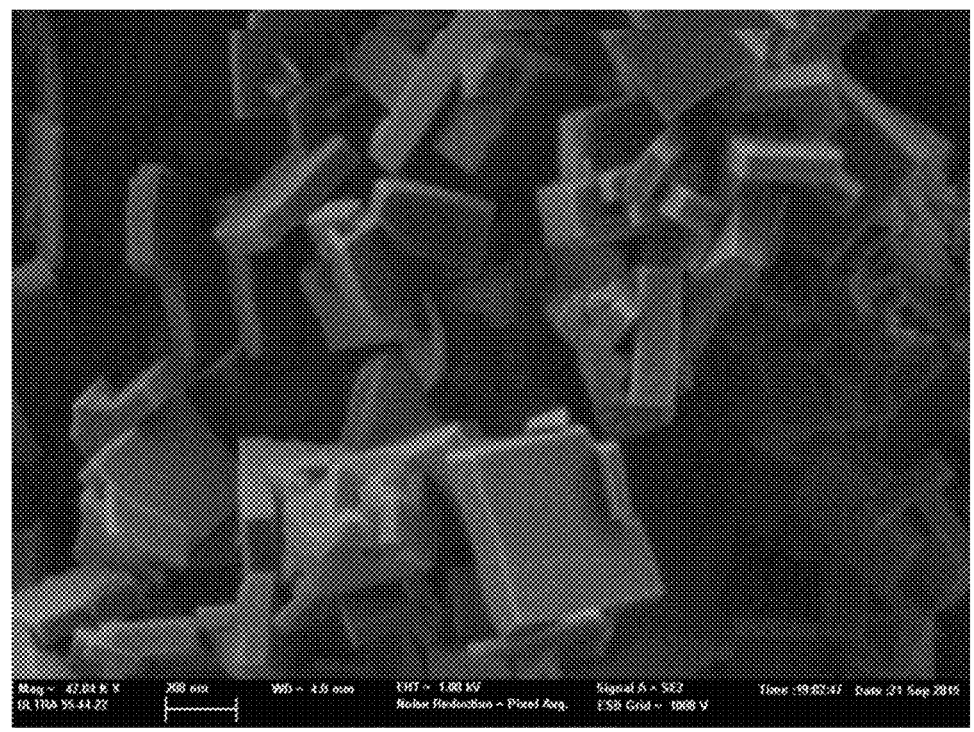
FIG. 7 is a SEM image of the Fe-AEI material synthesized according to Example 2.

The Fe-containing AEI zeolite prepared in Example 2 was characterized using scanning electron miscoscopy to determine the size of the primary zeolite crystals. FIG. 7 shows an image of the obtained material that indicates primary crystallite sizes up to 400 nm.

Example 15: Measurement of Porosity Loss During Accelerated Hydrothermal Aging of Fe-AEI Zeolites The surface area and porosity of a sample prepared according to Example 4 and the same sample hydrothermally aged according to Example 9 using nitrogen adsorption. The results are given in Table 1. As seen the surface area and porosity of the Na-free Fe-AEI catalyst is decreased less than 25% after the accelerated hydrothermal aging treatment.

TABLE 1

Surface area and porosity measurement of Na-free Fe-AEI before and after accelerated hydrothermal aging (according to Example 9).

| Material | BET surface area ($m^2/g$) | Micropore area* ($m^2/g$) | Micropore volume* ($cm^3/g$) |
|---|---|---|---|
| Na-free Fe-AEl | 516 | 505 | 0.25 |
| HT AGED Na-free Fe-AEl | 411 | 387 | 0.19 |
| Percentage loss | −20% | −23% | −24% |

*calculated using the t-plot method

The invention claimed is:

1. A method for the removal of nitrogen oxides from exhaust, flue or off gas by selective catalytic reduction in presence of ammonia as a reductant, comprising the steps of contacting the exhaust gas together with the ammonia or a precursor thereof with an SCR catalyst comprising a Fe-AEI zeolite material essentially free of alkali metal ions (Alk), having the following molar compositions:

$$SiO_2:oAl_2O_3:pFe:qAlk$$

wherein o is in the range from 0.001 to 0.2;
wherein p is in the range from 0.001 to 0.2;
wherein Alk is one or more of alkali metal ions and wherein q is below 0.02.

2. The method according to claim 1, wherein o is in the range from 0.005 to 0.1, p is in the range from 0.005 to 0.1 and q is below 0.005.

3. The method according to claim 1, wherein o is in the range from 0.02 to 0.07, p is in the range from 0.01 to 0.07 and q is below 0.001.

4. The method of claim 1, wherein the exhaust, flue or off gas contains more than about 1% steam.

5. The method of claim 1, wherein the exhaust, flue or off gas is at a temperature of above 200° C.

6. The method of claim 1, wherein the SCR catalyst is coated in or on a porous substrate, which may be a metallic substrate or an extruded ceramic substrate or a corrugated ceramic substrate.

7. The method of claim 6, wherein the substrate is in form of a flow-through monolith, a flow-through honeycomb, or a wall-flow filter.

8. The method of claim 6, wherein the SCR catalyst is coated in an amount of between 10 and 600 g/L calculated on the weight of catalyst material per volume of the total substrate plus the SCR catalyst.

9. The method of claim 8, wherein the amount is between 100 and 300 g/L.

10. The method of 6, wherein the SCR catalyst is coated in or on the porous substrate in form of a wash coat comprising the SCR catalyst and a binder comprising $TiO_2$, $SiO_2$, $Al_2O_3$, $ZrO_2$, $CeO_2$, and combinations thereof.

11. The method of claim 6, wherein the SCR catalyst is coated as a layer on the substrate and wherein the substrate comprises one or more further layers comprising a catalyst with a different catalytic activity or on other zeolite catalysts.

12. The method of claim 11, wherein the one or more further layers containing an oxidation catalyst comprising platinum or palladium or combinations thereof.

13. The method of claim 6, wherein the SCR catalyst is zone coated on the substrate, and wherein the substrate optionally comprises a further zone with an oxidation catalyst.

14. The method of claim 6, wherein the substrate comprises a zone with an ammonia slip catalyst.

15. The method of claim 1, wherein the exhaust, flue, or off gas is gas from a gas turbine system or a gas engine exhaust system.

16. The method of claim 15, wherein hydrocarbons and carbon monoxide further contained in the turbine exhaust gas are oxidized to water and carbon dioxide by contact with an oxidation catalyst.

17. The method of claim 16, wherein the oxidation catalyst is arranged up-stream or down-stream of the SCR catalyst.

18. The method of claim 15, wherein the gas turbine system is a system with a single cycle operational mode without any heat recovery system down-stream of a turbine.

19. The method of claim 15, wherein the SCR catalyst is arranged between a gas turbine and a heat recovery system generator.

20. A system for the cleaning of turbine exhaust gas comprising a catalyst unit downstream a gas turbine wherein the catalyst system comprises an SCR catalyst comprising a Fe-AEI zeolite material essentially free of alkali metal ions (Alk), having the following molar compositions:

$$SiO_2:oAl_2O_3:pFe:qAlk$$

wherein o is in the range from 0.001 to 0.2;
wherein p is in the range from 0.001 to 0.2;
wherein Alk is one or more of alkali metal ions and wherein q is below 0.02.

* * * * *